United States Patent [19]
Kaminsky

[11] 3,784,464
[45] Jan. 8, 1974

[54] PROCESS FOR WASHING SECONDARY SEPARATOR FROTH TO RECOVER BITUMEN

[75] Inventor: Victor Paul Kaminsky, Edmonton, Alberta, Canada

[73] Assignees: Canada Cities Service Ltd.; Imperial Oil Ltd.; Atlantic Richfield Canada, Ltd.; Gulf Oil Canada, Ltd., ; part interest to each

[22] Filed: Dec. 23, 1971

[21] Appl. No.: 211,549

[52] U.S. Cl. ............... 208/11, 209/155, 209/169, 209/173, 210/84, 210/219, 210/520
[51] Int. Cl. ............................................. C10g 1/00
[58] Field of Search .................... 210/49, 219, 519, 210/520, 523, 535, 83, 84; 261/84, 87, 88, 91, 93; 55/52, 53, 54, 169, 178, 199, 203, 55/206; 208/11; 209/162, 169, 453, 465

[56] References Cited
UNITED STATES PATENTS

| | | | |
|---|---|---|---|
| 2,296,437 | 9/1942 | Green | 210/49 |
| 3,306,007 | 2/1967 | Glasgow | 55/169 |
| 3,560,371 | 2/1971 | Kaminsky | 208/11 |
| 3,615,025 | 10/1971 | Rice et al. | 210/208 |

Primary Examiner—Samih N. Zaharna
Assistant Examiner—I. Cintins
Attorney—J. Richard Geaman

[57] ABSTRACT

Disclosed herein is a process for the separation of bitumen from Athabasca tar sands in which a secondary-separator froth stream is produced consisting primarily of bitumen entrained in tailings waters. The process comprises mixing the secondary-separator froth with fresh hot water and feeding the mixture downwardly through the inner zone formed by the draft tube, while preventing the mixture from rotating and forming a vortex, engaging the mixture in the tube by a down-throw impeller and then engaging the mixture in the tube by an up-throw impeller, to aid in the separation of the bitumen from the solids in the froth, passing the mixture into a lower quiescent settling zone, floating the bitumen to the surface of the liquid in the annulus formed by the draft tube, removing the floating bitumen from above the liquid level, removing the solids and water from the settling zone.

1 Claim, 3 Drawing Figures

PROCESS FOR WASHING SECONDARY SEPARATOR FROTH TO RECOVER BITUMEN

BACKGROUND OF THE INVENTION

The apparatus for carrying out the process of the present invention involves the intimate contacting of secondary-separator froth with fresh hot water. More particularly, the apparatus for carrying out the process of the present invention comprises a secondary-separator froth washer having stirring means comprising a downward-throw propeller and an upward-throw propeller positioned so as to cause intimate contacting of a hot fresh water wash stream and a secondary-separator froth with means for removing the separated bitumen and separated solids of water from the washer.

Various methods have been proposed for separating bitumen from bituminous sand. The two best-known methods are often referred to as the "hot water method" and the "cold water method." In the former, the bituminous sand is jetted with steam or hot water and mulled with a small proportion of water at about 175° F., and the pulp is then dropped into a turbulent stream of circulating water and carried through a separation cell maintained at an elevated temperature of about 180° F. In the separation cell, entrained air causes the oil to rise to the top in the form of a froth rich in bitumen which is then drawn off.

The so-called "cold water method" does not involve heating the bituminous sand other than whatever heating might be required to conduct the operation at room temperature. The process involves mixing the bituminous sand with water, soda ash and an organic solvent such as kerosene. The mixture is then permitted to settle at room temperature. A mixture of water and bitumen dissolved in the organic solvent rises to the top of the setting zone and is recovered.

In the operation of water separation processes of the type described above, it is desirable to obtain a bituminous froth containing maximum quantities of bitumen and minimum quantities of water and solids. Removal of water and solids from the froth is difficult and expensive. On the other hand, attempts to operate the process so as to reduce the amount of solids and water contained in the froth usually result in excessive quantities of bitumen passing from the process with waste streams, thereby reducing recovery of bitumen and increasing the pollution problem associated with waste material.

What is required is a process of and means for causing the intimate contacting of secondary-separator froth therewith a fresh hot water stream in order to provide for the deaeration and separation of the bitumen from the tailings water and solids.

It is an object of the present invention to provide a method of separating bitumen from a secondary-separator froth by intimately contacting said froth with a hot fresh water stream in a froth washer utilizing mechanically rotated marine type propellers.

The present invention may be more readily understood through referral to the accompanying drawings and following description.

SUMMARY OF THE INVENTION

The object of the present invention may be accomplished through a process which utilizes an apparatus comprising a secondary-separator froth washer. The washer comprises a froth wash vessel having a draft tube extending therein and allowing a quiescent settling zone to be formed below the draft tube. The draft tube is extended within the froth wash vessel to form an annulus between the outer wall of the draft tube and the inner wall of the froth wash vessel. A rotation arm is extended within the draft tube having a first down-throw propeller positioned upon the rotation arm within the draft tube and a second up-throw propeller positioned below the first down-throw propeller upon the rotation arm. In conjunction with the operation of the secondary-separator froth washer are means for removing separated bitumen from the annulus and means for removing separated solids and water from the lower portion of the froth wash vessel. In general, the upper portion of the froth wash vessel is opened with means for removing separated bitumen from the annulus comprising a decanting lip located upon the upper rim of the froth wash vessel and having directional flow baffles longitudinally positioned within the draft tube so as to cause minor flow of the hot fresh water bitumen mixture within the draft tube and to allow differential throw vectors to inhibit strong vortexing within the washed tube and gain a net downward flow within the draft tube.

The means for removing separated solids and water from the lower portion of the froth wash vessel may comprise a level controller positioned so as to sense the water solids mixture level in the froth wash vessel and a water-solids pump having its inlet connected to the lower portion of the froth wash vessel and being activated by the level controller. In general, the froth wash vessel will be cylindrical with the lower portion thereof being conically shaped passing into the inlet of the water-solids pump. The apparatus may further comprise a secondary-separator froth chute positioned upon the upper portion of the froth wash vessel so as to empty into the draft tube and provide a means for comingling the hot fresh water with the secondary-separator froth for introduction into the tube to be intimately contacted by the rotating propellers.

BRIEF DESCRIPTION OF THE DRAWINGS

The present invention may be more readily understood by referral to the accompanying drawings in which.

DETAILED DESCRIPTION OF THE INVENTION

Figure 1:
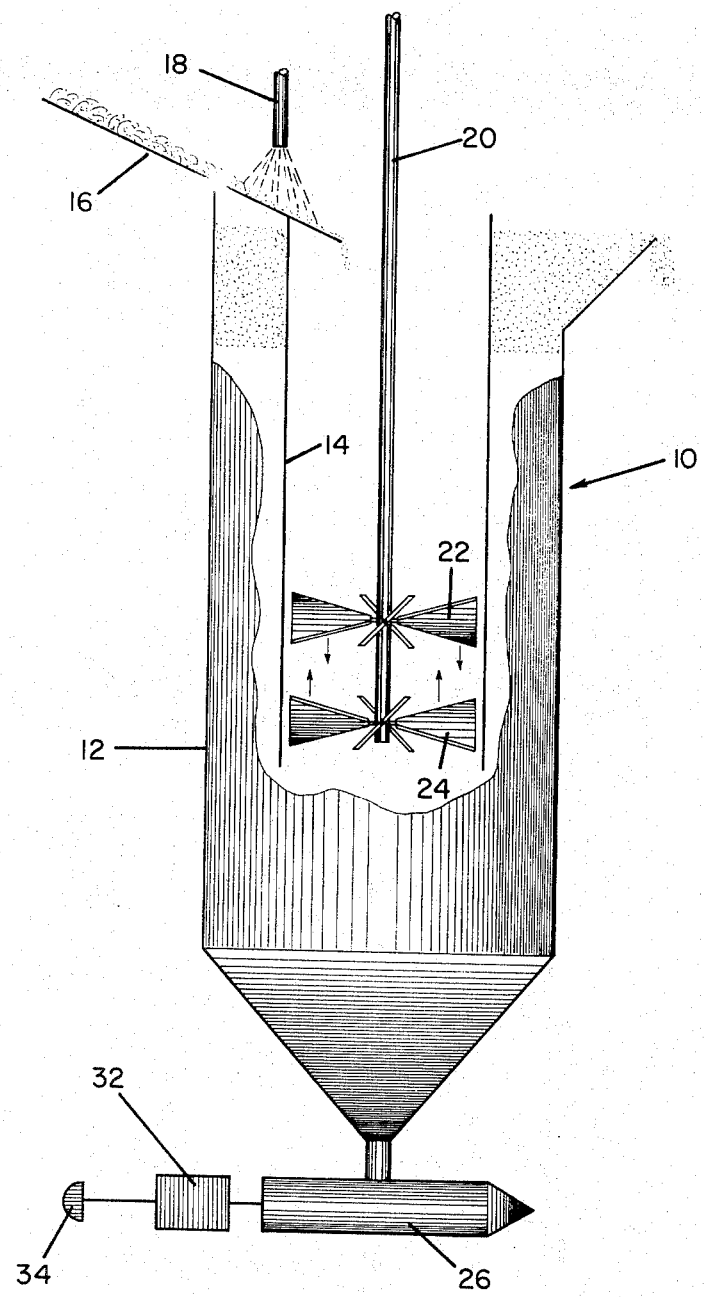
FIG. 1 represents an embodiment of the secondary-separator froth washer.

The various aspects of the process and apparatus for carrying out the process of the present invention may be most readily understood by referral to the accompanying figures in which a preferred embodiment of a secondary-separator froth washer as depicted. Particularly in FIG. 1, the secondary-separator froth washer has been indicated by numeral 10 as comprised of a froth wash vessel 12 being cylindrical in shape and having a conical lower portion. A longitudinally baffled draft tube 14 is introduced into the froth washer vessel 12 so as to form a quiescent settling zone in the lower portion of the froth wash vessel 12. The vessel 12 and the draft tube 14 serve to establish a body of liquid which has a liquid level below the top of vessel 12, and the draft tube divides the body into an inner zone and annulus above a quiescent settling zone. The baffled draft tube serves to prevent liquid in the inner concentric zone from rotating and forming a vortex. A rotation arm 20 is extended into the draft tube 14 having a first downward-throw propeller 22 positioned upon the rotation arm within the draft tube 14 and a second upward-throw propeller 24 positioned below the first downward-throw propeller 22 upon the rotation arm 20, within the draft tube 14. The propellers are disposed so that the mechanical rotation of the rotation arm 20 causes the first and second propellers 22 and 24, respectively, to cause intimate contacting of any fluid contained within the draft tube 14. The separated bitumen floats to the top of the liquid in the annulus and forms a layer above the liquid in this annulus.

The secondary-separator froth washer may further comprise means for removing separated bitumen from the annulus, particularly illustrated in FIG. 1, by the upper portion of the froth wash vessel 12 being opened and having a decanting lip upon the upper rim of the froth washer vessel 12 over which separated bitumen may flow free from the water. The apparatus may also have a means for removing separated solids and water from the lower portion of the froth wash vessel 12, for example comprising a pump 26 being activated by control 32 and solenoid 34. Not depicted on the FIG. 1, but comprising a preferred embodiment thereof, the secondary-separator froth washer would be a level controller positioned so as to sense the water froth interface level in the froth wash vessel 12 being connected in conjunction with a pump so that the pump causes fluid within the froth wash vessel 12 to enter its inlet and be removed therefrom the froth wash vessel 12 as activated by the level controller.

The secondary-separator froth washer of FIG. 1 is fed as shown by a secondary-separator froth chute 16 positioned upon the upper portion of the froth wash vessel 12 so as to empty into the draft tube 14 and having a fresh hot water inlet 18 positioned thereon so as to cause mixing of the fresh hot water with the bitumen-ladened secondary-separator froth. As depicted in the present invention, four-vaned marine-type propellers are utilized as the first and second propellers wherein the first and second propellers are optimally positioned about one propeller diameter apart. The pitched differential of the propellers has optimally been found through experiment to be placed between about 2° and about 5° so as to cause the upward-throw pitch of the lower propeller 24, the lower-most propeller upon the rotation arm 20 to be about 2° to 5° less than the downward pitch of the first propeller 22. This pitch causes a differential throw vector to be set to inhibit strong vortexing and provide sufficient flow for induction of the froth wash water into the mixing zone and create a net downward-flow toward the quiescent settling zone within the froth wash vessel 12.

Figure 2:
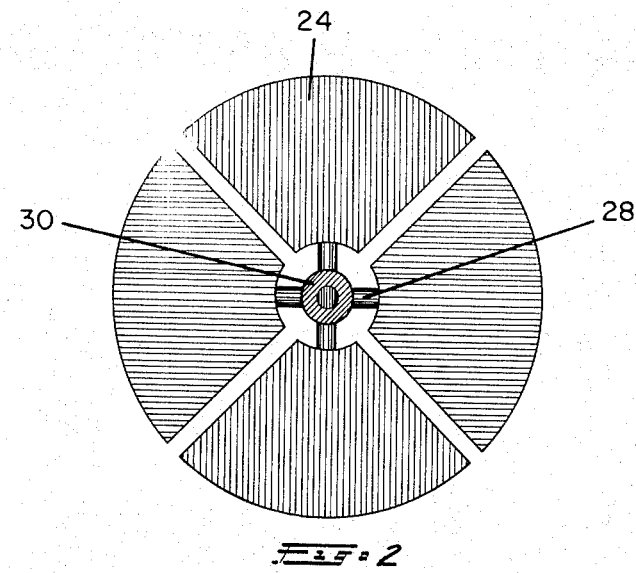
FIG. 2 represents the actual disposition of a preferred embodiment of a four-vane marine-type propeller which may be utilized to formulate the differential throw vectors and intimate contacting mechanism of the secondary-separator froth washer.
Figure 3:
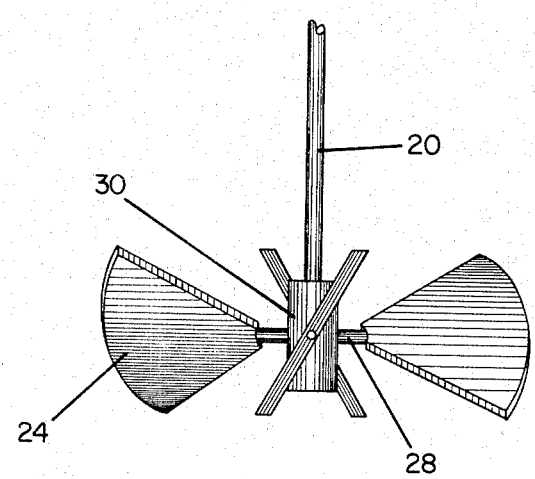
FIG. 3 represents a side view of the rotation arm and disposition thereof the marine-type differential throw propellers and their interaction for contacting of a hot fresh water with a bitumen within the secondary-separator froth washer.

The exact disposition of the froth washer variable pitched propellers 22 and 24 of FIG. 1 may be more readily depicted by referral to FIG. 2. The shaft connector 30 of the propeller is depicted having axial arms 28 connecting the vanes of the marine-type propeller 24 to the rotation arm. A four-vaned marine-type propeller 24, forming a circumferential body when in horizontal alignment with the diameter of the circumferential body, has a smaller diameter than the inside diameter of the draft tube contained within the secondary-separator froth wash so as to cause intimate contacting of introduced fluid through rotation. FIG. 3 may be referred to for rotational disposition of the propeller blades 24 as they axially rotate upon rotation arm 20 through axial arm 28 upon rotation connector 30.

Propeller speeds, wash water rates and wash water temperatures are not a prime concern of the construction of the apparatus of the pre-sent invention nor are materials of construction of particular importance, although suitable material must be provided so as to allow contacting of oil-based materials with water at temperatures in excess of 100° F. under slight differential pressures as caused by the rotation of the propeller blades. In general, any metallic material being relatively noncorrosive in contact with water-bitumen mixtures may be utilized as a suitable material for construction with either metallic, plastic or wooden propellers being operable within the apparatus.

Therefore, through utilization of the process and apparatus, one is provided with a process and means for contacting secondary-separator froth with a fresh hot water stream in order to provide for the ultimate recovery of bitumen from tailings water effluent from a primary-separator froth. The process allows for optimum removal and recovery of bitumen from the water treatment of Athabasca tar sands.

While the invention has been described above with respect to certain embodiments thereof, it will be understood by those skilled in the art that various changes and modifications may be made without departing from the spirit and scope of the invention as set forth herein.

Therefore, I claim:

1. A process for washing a secondary separator froth to recover bitumen, which comprises establishing a body of liquid within a froth washing vertically disposed cylindrical vessel having an inverted conical bottom, wherein the body is divided into an inner zone and an annulus by a draft tube extending from the top of the vessel to adjacent the conical bottom, said zone and annulus being above a quiescent settling zone, feeding the secondary-separator froth and fresh hot water into the top of the draft tube, moving the froth and water downwardly through the tube while preventing the mixture from rotating and forming a vortex, engaging the downward moving mixture with a down-throw impeller rotating in the draft tube, then engaging the mixture with an up-throw propeller rotating in the draft tube on the same axis and at the same speed as said down-throw impeller, to aid in the separation of the bitumen from the solids, passing the mixture into the quiescent settling zone, floating the bitumen upwardly through the annulus between the draft tube and inner wall of the vessel while maintaining the liquid in said annulus substantially stationary and forming a layer of bitumen above the liquid level, removing the bitumen from above the liquid level, and removing the water and solids from the quiescent settling zone at such a rate as to maintain the level of liquid below the top of the vessel and draft tube.

* * * * *